United States Patent [19]

Arima

[11] Patent Number: 4,720,620
[45] Date of Patent: Jan. 19, 1988

[54] METHOD OF CUTTING METAL INTERCONNECTIONS IN A SEMICONDUCTOR DEVICE

[75] Inventor: Junichi Arima, Itami, Japan

[73] Assignee: Mitsubishi Denki Kabushiki Kaisha, Tokyo, Japan

[21] Appl. No.: 769,768

[22] Filed: Aug. 27, 1985

[30] Foreign Application Priority Data

Nov. 5, 1984 [JP] Japan .................................. 59-234765

[51] Int. Cl.$^4$ ............................................. B23K 26/00
[52] U.S. Cl. ............................ 437/173; 219/121 LG;
219/121 LJ; 219/121 FS; 219/121 LN; 29/584;
437/245
[58] Field of Search ................. 219/121 LG, 121 LN,
219/121 LC, 121 LD, 121 FS, 121 LJ, 121 LR,
121 LH; 29/584

[56] References Cited

U.S. PATENT DOCUMENTS

| | | | |
|---|---|---|---|
| 3,750,049 | 7/1973 | Dowley et al. | 219/121 FS |
| 4,162,390 | 7/1979 | Kelly | 219/121 FS |
| 4,220,842 | 9/1980 | Sturmer et al. | 219/121 FS |
| 4,504,726 | 3/1985 | Hosaka et al. | 219/121 LH |

OTHER PUBLICATIONS

"Laser Targeting Considerations in Redundant Memory Repair", by D. Smart, R. Reilly, B. Wells et al., Proc. Spie Int. Soc. Opt. Eng. (U.S.A.) vol. 385, Jan. 1983, pp. 97–101.
"Oxygen Cutting", Welding Handbook, Third Edition, pp. 543, 544, 6–1971.

Primary Examiner—M. H. Paschall
Attorney, Agent, or Firm—Lowe, Price, Leblanc, Becker & Shur

[57] ABSTRACT

In a method of cutting metal interconnections in a semiconductor device according to the present invention, a semiconductor wafer (5) which has metal interconnections having a high melting point is placed in an oxygen atmosphere (9) within a chamber (6), and laser beams (4) are irradiated through an optical system (2) and an optical beam positioner (3) on the high melting point metal interconnections while maintaining the interior of the chamber (6) at a vacuum of 1 to 10 mTorr, and introducing oxygen from an oxygen inlet port (7) under a pressure of 1 to 1.5 Torr. to sublimate and cut the high melting point metal interconnections.

14 Claims, 4 Drawing Figures

METHOD OF CUTTING METAL INTERCONNECTIONS IN A SEMICONDUCTOR DEVICE

BACKGROUND OF THE INVENTION

1. Field of the Invention

The present invention relates to a method of laser cutting metal interconnections in a semiconductor device. More specifically, it relates to an improvement in a method of laser cutting metal interconnections formed on a semiconductor wafer in a semiconductor device.

2. Description of the Prior Art

A well known method of cutting metal interconnections formed on a semiconductor wafer by laser beams is disclosed in "Laser Targeting Considerations in Redundunt Memory Repair" reported by D. Smart, R. Reilly, B. Wells et al. in Proc. Spie Int. Soc. Opt. Eng. (USA) Vol. 385, January 1983, pp. 97–101.

FIG. 1 is a conceptual schematic diagram showing a conventional laser trimming device. In FIG. 1, a laser beam 4 emitted from a laser beam source 1 is supplied through an optical system 2 to an optical beam positioner 3. The laser beam 4 emitted from the laser beam source 1 is supplied to the optical beam positioner 3 through the optical system 2 for the following reason: the energy of the laser beam directly emitted from the laser beam source 1 depends on the characteristics of crystals in the laser beam source 1 which is implemented by, e.g., a solid laser. Such energy is not constant and must be set as appropriate beam energy by the optical system 2. The optical beam positioner 3 is adapted to control positions of the laser beam 4 to be irradiated on metal interconnections, having a high melting point, which are formed on a semiconductor wafer 5. The high melting point metal interconnections formed on the semiconductor wafer 5 are cut by the irradiated laser beams 4.

In the conventional laser trimming apparatus, structured in the aforementioned manner, the high melting point metal interconnections are made molten and then are cut by the laser beams 4 in the atmosphere, whereby hot splashes of the molten metal interconnections are scattered and cause a short circuit between adjacent interconnections on the semiconductor device and damage in adjacent circuits.

SUMMARY OF THE INVENTION

Accordingly, the principal object of the present invention is to provide a method of cutting metal interconnections in a semiconductor device, in which hot splashes of molten metal interconnections having a high melting point exert no influence on adjacent interconnections and circuits.

Briefly stated, the method according to the present invention includes a step of setting a semiconductor wafer formed with metal interconnections having a high melting point. These metal interconnections are to be cut in an atmosphere which is capable of sublimating the metal interconnections heated by laser beams, thereby to cut the high melting point metal interconnections by the laser beams.

Thus, according to the present invention, the high melting point metal interconnections are processed in an atmosphere that can sublimate and cut the same by laser beams, whereby no hot splashes are caused to influence adjacent interconnections and circuits.

The above and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
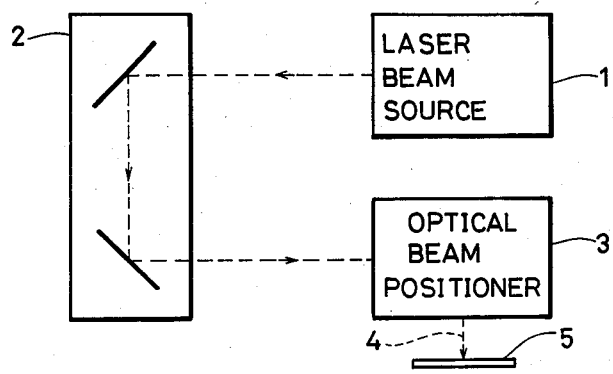
FIG. 1 is a conceptual schematic diagram showing a conventional laser trimming device.
Figure 2:
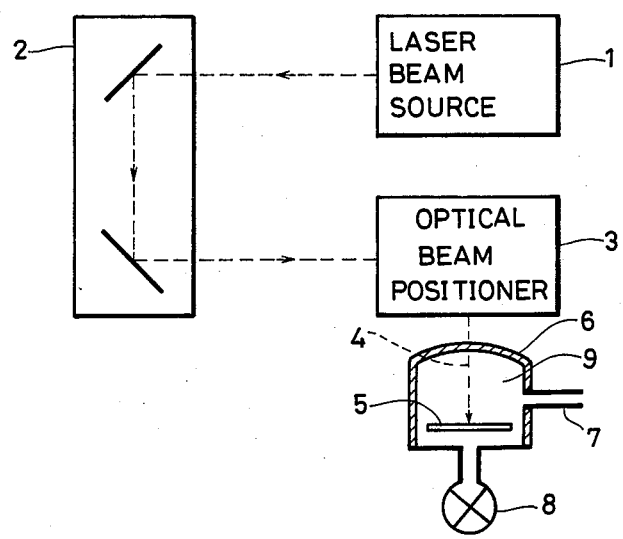
FIG. 2 is a schematic diagram showing definite structure of an embodiment of the present invention.
Figure 3:
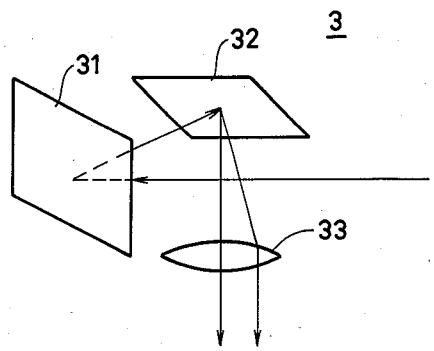
FIGS. 3 and 4 are schematic diagrams showing optical beam positioners employable in the embodiment of the present invention.
Figure 4:
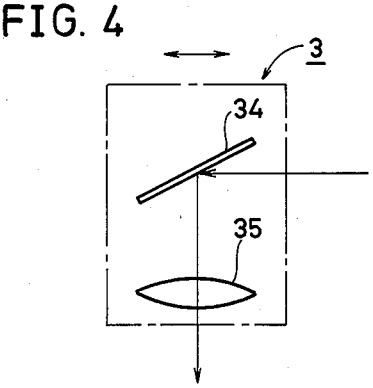

The structure of an embodiment of the present invention is best understood with reference to FIGS. 2–4. A laser beam source 1 and an optical system 2 as shown in FIG. 2 are identical to those of FIG. 1. An optical beam positioner 3 is adapted to scan, by laser beams 4, a wafer position control mark formed on a semiconductor wafer 5 by metal interconnections to detect relative positions of the mark and the coordinate system of the optical beam positioner 3, thereby to irradiate the laser beams 4 on a desired portion of wafer 5. Such an optical beam positioner 3 is implemented as shown in FIG. 3 or 4.

The optical beam positioner 3 as shown in FIG. 3 is formed by a first reflecting mirror 31, a second reflecting mirror 32 and a convex lens 33, and the laser beams 4 emitted from the laser beam source 1 are reflected by the first reflecting mirror 31 to be further reflected by the seciond reflecting mirror 32, thereby to be focused through the convex lens 33. The first reflecting mirror 31 is rotatable about its vertical axis while the second reflecting mirror 32 is rotatable about its lateral axis, and the laser beams 4 are made to scan the semiconductor wafer 5 by rotation of the first and second reflecting mirrors 31 and 32 at prescribed angles.

The optical beam positioner 3 as shown in FIG. 4 is integrally formed by a reflecting mirror 34 and a convex lens 35, to scan the semiconductor wafer 5 by the laser beams 4 by mechanically moving the reflecting mirror 34 and convex lens 35 in the directions indicated by arrows.

According to the present invention, further, the laser beams 4, position-controlled by the optical beam positioner 3, are irradiated in a chamber 6 which is provided with an oxygen gas inlet port 7 and an exhaust system 8. See FIG. 2. The inner wall of the chamber 6 is formed of for example, $SiO_2$ (glass), so that the laser beam 4 position-controlled by the optical beam positioner 3 is inwardly irradiated through the wall of the chamber 6 by setting the laser beam 4 to have a wavelength of 1 $\mu$m. The chamber 6 is filled with an oxygen atmosphere 9, and the semiconductor wafer 5 formed with the high melting point metal interconnections is placed in the oxygen atmosphere 9 within the chamber 6.

In the present embodiment, the interior of the chamber 6 is retained at a constant vacuum of, for example, 1 to 10 mTorr. by the exhaust system 8, and oxygen is introduced from the oxygen gas inlet port 7 at a constant low pressure, e.g., 1 to 1.5 Torr. In this state, the laser beam 4 from the laser beam source 1 is irradiated through the optical system 2 and optical beam positioner 3 on the high melting point metal interconnections on the semiconductor wafer 5 placed in the oxygen atmosphere 9 within the chamber 6, thereby to sublimate and cut the high melting point metal interconnections.

Although the oxygen atmosphere is employed in the aforementioned embodiment, the atmosphere may be formed by any other gas which can sublimate the high melting point interconnections of, e.g., molybdenum silicide, by irradiation of the laser beam 4. In this case, the molybdenum silicide is not directly sublimated, but partially heated with oxygen $O_2$ by the laser beams 4 so that the part irradiated by the laser beams 4 is converted into $MoO_3$ to be sublimated. The sublimation temperature of $MoO_3$ is about 800° to 1000° C.

The method according to the present invention can also be applied to patterning of a metal thin film having a high melting point.

As hereinabove described, the high melting point metal interconnections formed on the semiconductor wafer 5 are sublimated and cut by the laser beams 4 in the oxygen atmosphere 9, whereby the manufacturing yield of semiconductor devices can be improved without exerting any bad influence on adjacent interconnections and circuits.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of cutting metal interconnections in a semiconductor device formed on a surface of a semiconductor wafer, said method comprising the steps of:
    placing said semiconductor wafer and said semiconductor device in a low pressure gaseous atmosphere maintained at a low pressure in the range 1 to 10 mTorr to facilitate sublimation of said metal interconnections when the metal interconnections are irradiated; and
    irradiating a laser beam on desired positions of said metal interconnections, to sublimate and thereby cut said metal interconnections at said positions.

2. A method of cutting metal interconnections in a semiconductor device in accordance with claim 1 wherein:
    said metal interconnections comprise a member of a group including molybdenum and molybdenum silicide.

3. A method of cutting metal interconnections in a semiconductor device formed on a surface of a semiconductor wafer, said method comprising the steps of:
    placing said semiconductor wafer and said semiconductor device in a low pressure gaseous atmosphere maintained at a low pressure in the range 1 to 10 mTorr to facilitate sublimation of said metal interconnections when the metal interconnections are irradiated, said low pressure gaseous atmosphere comprising oxygen which combines with a metal of said metal interconnections to form an oxide thereof when irradiated; and
    irradiating a laser beam on desired positions of said metal interconnections to form and sublimate said oxide and thereby cut said metal interconnections at said positions.

4. A method of cutting metal interconnections in a semiconductor device in accordance withh claim 3, wherein:
    said metal interconnections comprise a member of a group including molybdenum and molybdenum silicide.

5. A method of cutting metal interconnections in a semiconductor device in accordance with claim 3, comprising the further steps of:
    providing a flow of oxygen, at a pressure in the range 1 to 1.5 mTorr, to said maintained low pressure gaseous atmosphere.

6. A method of cutting metal interconnections in a semiconductor device in accordance with claim 4, comprising the further step of:
    providing a flow of oxygen, at a pressure in the range 1 to 1.5 mTorr, to said maintained low pressure gaseous atmosphere.

7. A method of cutting metal interconnections in a semiconductor device formed on a surface of a semiconductor wafer, comprising the steps of:
    placing said semiconductor wafer and said semiconductor device in a low pressure gaseous atmosphere that includes a gas capable of combining chemically with a metallic constituent of said metal interconnections when subjected to a high temperature therewith;
    irradiating a laser beam on a desired position of said metal interconnections to generate a high local temperature thereat, whereby said gas and said metallic constituent undergo said chemical reaction and a product formed of said chemical reaction sublimates during said laser irradiation to generate a cut at said desired position.

8. A method according to claim 7, wherein:
said gas is oxygen.

9. A method according to claim 7, wherein:
said low pressure is maintained in the range 1-10 mTorr.

10. A method according to claim 9, wherein:
said gas is oxygen.

11. A method according to claim 9, comprising the further step of:
    providing a flow of oxygen, at a pressure in the range 1 to 1.5 mTorr, to said maintained low pressure gaseous atmosphere.

12. A method according to claim 11, wherein:
said gas is oxygen.

13. A method according to claim 11, wherein:
said metallic constituent comprises a member of a group including molybdenum and molybdenum silicide.

14. A method according to claim 7, wherein:
said high temperature is in the range 800°-1000° C.

* * * * *